United States Patent
Pountney et al.

[15] 3,657,488
[45] Apr. 18, 1972

[54] RECORDING AND REPRODUCING SYSTEM FOR WORK TIME STUDY

[72] Inventors: Laurence Howard Pountney, 410 Kedleston Road, Derby; Clifford Roy Amsbury, Swarfdale, Trent Lane, King's Newton, both of England; Stanley John Antliff, deceased, 20 Cole Lane, late of Ockbrook, England

[22] Filed: Mar. 28, 1969

[21] Appl. No.: 811,681

[30] Foreign Application Priority Data

Mar. 28, 1968 Great Britain...................14,941/68

[52] U.S. Cl.......179/100.1 R, 179/100.2 MD, 179/100.3 B, 340/174.1 A, 346/20
[51] Int. Cl...............G11b 23/18, G11b 23/30, G11b 27/20
[58] Field of Search............179/100.1 R, 100.1 C, 100.2 S, 179/100.3 D, 6 TA, 2 TC, 100.2 MD, 100.3 B; 346/20; 340/174.1 A

[56] References Cited

UNITED STATES PATENTS

| | | | |
|---|---|---|---|
| 2,849,704 | 8/1958 | Neff | 340/174.1 |
| 3,044,042 | 7/1962 | Erath | 346/20 X |
| 3,075,050 | 1/1963 | Lorenz | 179/100.2 |
| 3,167,777 | 1/1965 | Zagorites et al. | 346/20 X |
| 3,237,171 | 2/1966 | Young | 346/20 X |
| 3,409,895 | 1/1968 | Hayden | 346/20 |
| 3,158,426 | 11/1964 | Doersam et al. | 346/20 |

Primary Examiner—Stanley M. Urynowicz, Jr.
Assistant Examiner—Raymond F. Cardillo, Jr.
Attorney—Cushman, Darby & Cushman

[57] ABSTRACT

The invention relates to a work study recording system by which a work study engineer can analyze an operator's performance of a job consisting of a number of operations. The system has facilities for recording timing signals at the start and finish of each operation; measuring the intervals between successive timing signals and automatically recording the results in coded form; recording additional auxiliary coded information; recording spoken information; and playing back the recorded information.

26 Claims, 2 Drawing Figures

Patented April 18, 1972
3,657,488
2 Sheets-Sheet 1
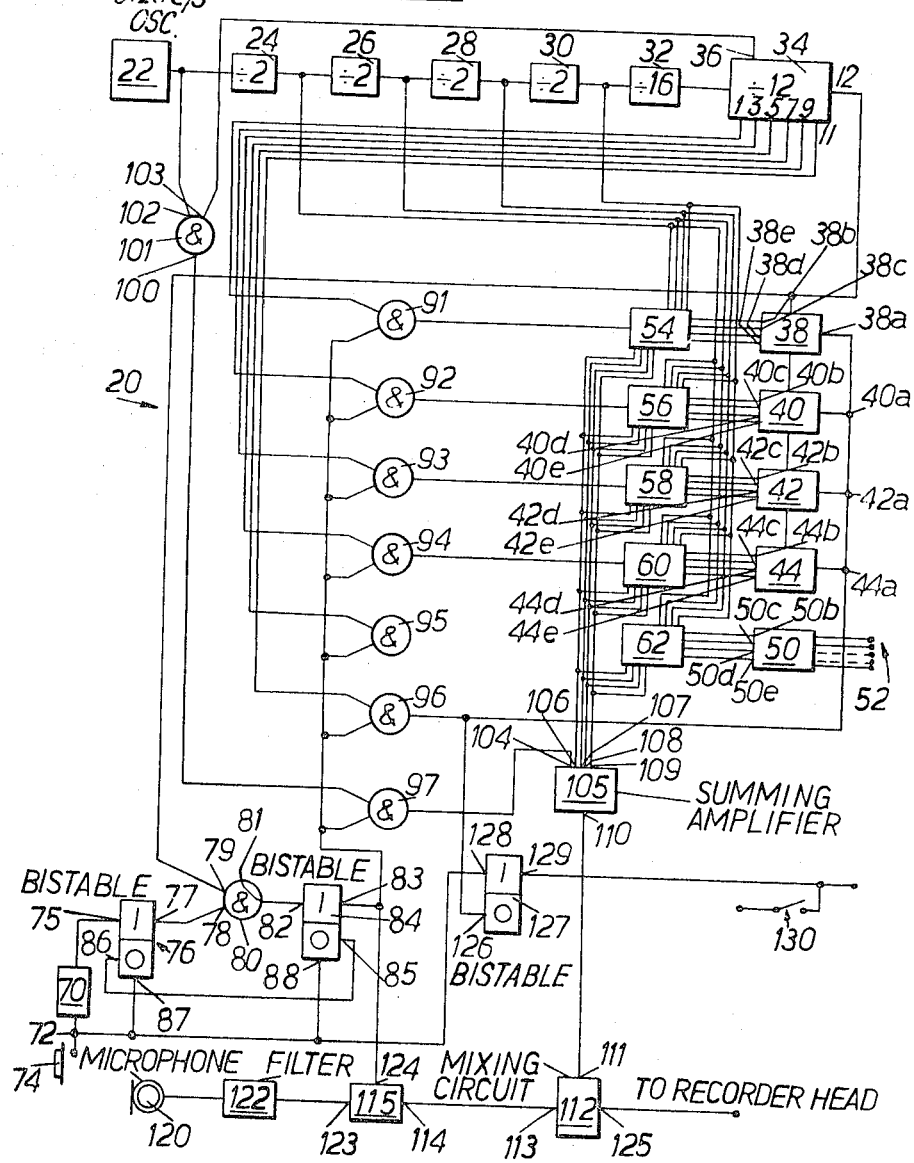

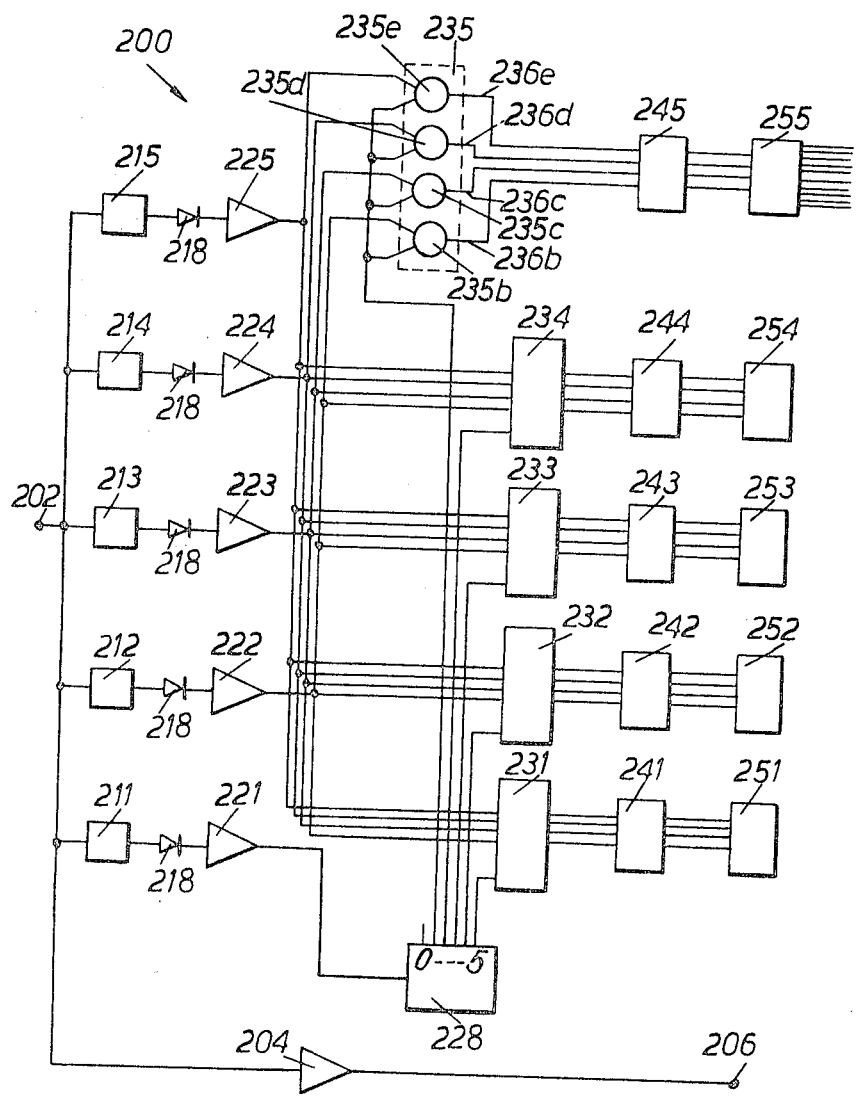

RECORDING AND REPRODUCING SYSTEM FOR WORK TIME STUDY

This invention relates to improvements in, or modifications to, recording systems as described and claimed in our co-pending British application Pat. No. 45982/67.

In our co-pending application Pat. No. 45982/67 there is claimed a recording system, for use in the analysis of an operator's performance of a production process or other job consisting of a number of operations, including an electrical recording circuit adapted to be connected to recording equipment, said recording circuit comprising means whereby spoken information may be recorded, means whereby timing signals corresponding to the commencement and termination of each operation may be recorded and mechanically operable means whereby further coded information may be recorded.

According to the improvement of the present invention, the electrical recording circuit includes means for measuring the intervals between successive timing signals, means for producing coded signals representative of the durations of the intervals and means whereby the coded signals may be recorded.

The means for measuring the intervals between successive timing signals preferably comprises a pulse generator operatively connected to a counter.

Preferably the counter is adapted to produce output signals in binary-coded decimal form.

The mechanically operable means whereby further coded information may be recorded preferably comprises a further counter adapted to produce output signals in binary-coded decimal form.

In a preferred embodiment of the invention, the means for producing coded signals representative of the durations of the intervals comprises gating means connected to receive the output signals from the first mentioned counter and adapted to produce coded signals the frequency of which is dependent upon said output signals from the first mentioned counter.

The gating means is preferably also connected to receive the output signals from the further counter and adapted to produce coded signals the frequency of which is dependent upon said output signals from the further counter.

Thus there may be provided frequency dividing means connected to receive pulses from the pulse generator and adapted to produce a plurality of frequency signals whose frequencies are harmonics of the lowest frequency, said gating means being connected to receive said frequency signals so as to produce said coded signals.

The invention will now be particularly described, by way of non-limitative example only, with reference to the accompanying drawings, in which:

FIG. 1 is a block circuit diagram of a recording circuit for use in a work study recording system in accordance with the invention; and FIG. 2 is a block circuit diagram of a replay circuit for use in a work study recording system in accordance with the invention.

In FIG. 1 there is shown a recording circuit 20 comprising a 5,120 c./s. oscillator 22, which may for example be a crystal-controlled oscillator or a Wien bridge oscillator, connected via four "divide-by-two" bistable circuits, 24, 28, 28, 30 in series to a "divide-by-sixteen" circuit 32. The divide-by-sixteen circuit 32 may comprise four further bistable circuits (not shown) connected in series.

The output of the divide-by-sixteen circuit 32 is connected to the input of a "divide-by-twelve" counter circuit 34 which comprises a number of bistable circuits (not shown) connected in series with appropriate feedback. The counter circuit 34 also incorporates a binary-to-decimal converter (not shown) and is provided with 12 outputs connected so as to be sequentially energized by signals applied to the input of the counter circuit 34: only the odd-numbered outputs 1,3,5,7,9 and 11 and the last output 12 are shown in the drawing. The first bistable circuit in the counter circuit 34, which is connected to the input thereof, has an output which is connected to a further output 36 of the counter circuit 34.

The output 12 of the counter circuit 34 is connected to the input of a further counter circuit comprising four decades 38, 40, 42, 44 in series. Each decade such as 38 has a reset input 38a, and four outputs 38b, 38c, 38d, 38e, adapted to produce signals in binary-coded decimal form; the respective inputs and outputs of the other decades are correspondingly numbered. The recording circuit 20 is also provided with a coding circuit 50, which may comprise four bistable circuits (not shown) connected in series and which may be set to any one of up to sixteen states by means of push buttons 52. The coding circuit 50 has four outputs 50b, 50c, 50d, 50e, also adapted to produce signals in binary-coded decimal form.

The suffixes $b$, $c$, $d$, and $e$ respectively correspond to binary signals representative of $2^0$, $2^1$, $2^2$, and $2^3$.

The outputs 38b, 38c, 38d, 38e of the decade 38 are connected to a gating circuit 54 which comprises four three-input AND gates (not shown), one of the inputs of each AND gate being connected to a respective one of the outputs of the decade 38. Another of the inputs of each AND gate is connected to a respective one of the outputs of the bistable circuits 24, 26, 28, 30. Thus the output 38b of the decade 38 and the output of the bistable circuit 24 are respectively connected to two inputs of one of the three-input AND gates in the gating circuit 54, while the output 38c and the bistable circuit 26, the output 38d and the bistable circuit 28, and the output 38e and the bistable circuit 30 are similarly associated with two inputs of each of the remaining three AND gates.

The respective outputs of the decades 40, 42, 44 and of the coding circuit 50 are combined with the outputs of the bistable circuits 24, 26, 28, 30 in respective gating circuits 56, 58, 60, 62 identical to the gating circuit 54, in a manner analogous to that described above.

The recording circuit 20 is further provided with a monostable circuit 70 having an input 72 adapted to be energized by means of a push-button timing switch 74. The output of the monostable circuit 70 is connected to the "1" input 75 of a bistable circuit 76, the "1" output 77 of which is connected to one input 78 of two-input AND-gate 80. The other input 79 of the AND-gate 80 is connected to the output 12 of the counter circuit 34, while the output 81 of the AND-gate 80 is connected to the "1" input 82 of a bistable circuit 84. The "0" output 85 of the bistable circuit 84 is connected to the "0" input 86 of the bistable circuit 76, while respective reset inputs 87, 88 of the bistable circuits 76, 84 are connected to the input 72 of the monostable circuit 70.

The "1" output 83 of the bistable circuit 84 is connected to one input of each of seven two-input AND-gates 91-97. The other inputs of the AND-gates 91-96 are respectively connected to the outputs 1,3,5,7,9,11 of the counter circuit 34, while the other input of the AND gate 97 is connected to the output 100 of a further two-input AND-gate 101. One input 102 of the AND gate 101 is connected to the output of the 5,120 c./s. oscillator 22, while the other input 103 is connected to the output 36 of the counter circuit 34.

The outputs of the AND-gates 91-95 are respectively connected to the third input of each three-input AND gate in the gating circuits 54,56,58,60,62 respectively, while the output of the AND-gate 96 is connected to the reset inputs 38a, 40a, 42a, 44a, of the decades 38, 40, 42, 44 and to the "0" input 126 of a bistable circuit 127.

The output of the AND-gate 97 is connected to one input 104 of a summing amplifier 105, which may be a conventional, multi-input operational amplifier. The summing amplifier 105 has four further inputs 106, 107, 108, 109 each of which is connected to the output of a respective one of the four three-input AND gates in each of the gating circuits 54, 56, 58, 60, 62. Thus the outputs of all the three-input AND gates associated with a particular suffix $b$, $c$, $d$ or $e$ are commoned.

The output 110 of the summing amplifier 105 is connected to one input 111 of a mixing circuit 112 having a further input 113 connected to the output 114 of a two-input gate 115. A microphone 120 is connected, via a filter 122 which prevents the transmission of signals having a frequency in the region of 5,120 c./s., to one input 123 of the gate 115, the other input 124 of which is connected to the "1" output 83 of the bistable circuit 84.

The output 125 of the mixing circuit 112 is connected to the recording head (not shown) of the suitable recording equipment such as a tape recorder, wire recorder or disc recorder.

The input 72 of the monostable circuit 70 is connected to the "1" output 129 of which is connected, via a power amplifier (not shown) to the motor of the recording equipment. A push switch 130 is also operatively connected to the motor of the recording equipment.

In operation, a work study engineer wishing to analyze an operator's performance of a production process or other job consisting of a number of operations energizes the recording circuit 20 and then depresses the push-button timing switch 74 when the operator commences working.

Operation of the switch 74 resets the bistable circuits 76, 84 to their "0" states if necessary, triggers the monostable circuit 70, which has a time constant of about one second, and triggers the bistable circuit 127 into its "1" state. The bistable circuit 127 in turn energizes the motor of the recording equipment. After a delay of one second, which is chosen to be sufficient to enable the motor to reach a steady speed, a negative-going voltage transition occurs at the output of the monostable circuit 70, which transition triggers the bistable circuit 76 into its "1" state, thereby opening the AND-gate 80.

The next subsequent energization of the output 12 of the counter circuit 34 (the output 12 is energized 100 times per minute) triggers the bistable circuit 84, via the open AND-gate 80, into its "1" state, thereby opening the AND-gates 91–97 and closing the gate 115.

It will be appreciated that the decades 38, 40, 42, 44 act as a counter/timer circuit, indicating elapsed time as will hereinafter be described. The arrangement of the frequency dividing circuits 24, 26, 28, 30 and 34 is such that the decades 38, 40, 42, 44 indicate up to 100 minutes in centiminute units. It will also be appreciated that the total accumulated in the decades 38, 40, 42, 44 determines the condition of one input of each three-input AND gate in the gating circuits 54, 56, 58, 60.

Thus the next subsequent energization of the output 1 of the counter circuit 34 energizes another input of all four three-input AND gates in the gating circuit 54, via the AND gate 91, for a period of 50 milliseconds. If any of the outputs 38b, 38c, 38d, 38e of the decade 38 is energized, therefore, a "burst" of 2,560, 1,280, 640 or 320 c./s. square waves appears at the corresponding input 106, 107, 108 or 109 of the summing amplifier 105, the "burst" being of 50 milliseconds duration.

Fifty milliseconds after the termination of the energization of the output 1 of the counter circuit 34, the output 3 becomes energized thus causing a sequence of events exactly analogous to those described in the preceding paragraph; similar arguments apply to the energization of the outputs 5 and 7. When the output 9 is energized, again a similar series of events occurs, but the signals on the inputs 106, 107, 108 and 109 of the summing amplifier 105 are determined by the number stored in the coding circuit 50.

It will be appreciated that the AND gate 101 is opened by the output 36 of the counter circuit 34 during each of the 50 millisecond periods above-mentioned, permitting the transmission of "bursts" of 5,120 c./s. square waves to the input 104 of the summing amplifier 105.

The signal at the output 110 of the summing amplifier 105, which signal passes to the recording head of the recording equipment via the mixing circuit 112, therefore comprises five 50-millisecond "bursts" of square waves separated by 50 millisecond intervals, each burst comprising square waves having a frequency of 5,120 c./s. and up to four other frequencies, which square waves have been algebraically added together.

Thus, if for example the time indicated by the decades 38, 40, 42, 44 is 3,271 centiminutes and the number 9 is stored in the coding circuit 50, the first "burst" at the output 110 of the summing amplifier 105 will contain square waves having frequencies of 5,120, 2,560 and 1,280 c./s., the second "burst" will include the frequencies 5,120 and 1,280 c./s., the third "burst" will include the frequencies 5,120, 2,560, 1,280 and 640 c./s., the fourth "burst" will include the frequencies 5,120 and 2,560 c./s. and the fifth "burst" will include the frequencies 5,120, 2,560 and 320 c./s.

When the output 11 of the counter circuit 34 is energized, the decades 38, 40, 42, 44 are reset to zero and the bistable circuit 127 is triggered into its "0" state via the AND-gate 96, so that the decades 38, 40, 42, 44 may commence timing the duration of the first operation, while when the output 12 of the counter circuit 34 is energized the AND-gate 80 is closed, thereby resetting the bistable circuits 84 and 76 into their "0" states and opening the gate 115.

At any time during the first operation the work study engineer may start the motor of the recording equipment by means of the switch 130 and record a spoken commentary via the microphone 120. The gate 115 is provided to prevent the recording of speech during recording of the timing and other coded information, although it will be appreciated that the gate 115 is closed for less than one second at a time. The work study engineer also assesses the rate at which the operator is working, and selects the appropriate switch 52: this selection may be changed at any time during the operation.

At the end of the first operation, the work study engineer again depresses the timing switch 74 and thus initiates a sequence of events similar to those described hereinbefore. It will be appreciated therefore that the information relating to a particular operation is recorded at the start of the next operation. Thus in the case of the first operation, means for ensuring that the timing information recorded at the start thereof is zero may be provided; alternatively, the first piece of coded information recorded may be ignored.

The recording circuit of the present invention effects a considerable saving of tape (or other recording medium) since the tape is only running when either spoken or coded information is being recorded, and not for the whole duration of the process being studied.

Turning now to FIG. 2, there is shown a replay circuit 200 having an input 202 which is connected via a conventional audio amplifier 204 to an output 206. The output 206 is connected to a loudspeaker (not shown). The input 202 is also connected to the respective inputs of filters 211, 212, 213, 214 and 215 which respectively transmit only those frequencies in the region of 5,120, 2,560, 1,280, 640 and 320 c./s. The outputs of the filters 211–215 are connected to respective Schmitt trigger circuits 221–225 via rectifiers 218.

The output of the Schmitt trigger 221 is connected to the input of a six-state ring counter 228 having six outputs numbered 0 to 5 which are connected so as to be energized in sequence by signals applied to the input thereof.

The respective outputs of the Schmitt trigger circuits 222–225 are connected to five gating circuits 231–235, one of which is shown in detail at 235. It can be seen that the gating circuit 235 comprises four two-input AND-gates 235b, 235c, 235d and 235e. One input of each of the AND-gates 235b, 235c, 235d, 235e, is connected to the output of the Schmitt triggers 232–235 respectively, while the other input of each of the AND gates 235b, 235c, 235d, 235e, is connected to the output 1 of the counter 228.

The gating circuits 231–234 are similarly constituted and similarly connected to the Schmitt triggers 222–225. However, they are respectively connected to the output 5, 4, 3 and 2 of the counter 228.

The gating circuit 235 has four outputs 236b, 236c, 236d and 236e which are respectively connected internally to the outputs of the AND-gates 235b, 235c, 235d, 235e and connected externally to a store 245. The store 245 may for example comprise four bistable circuits (not shown), and has four outputs which produce signals representative of, but of longer duration than, the input signals. The outputs of the store 245 are in turn connected to the inputs of a binary-to-decimal converter circuit 255.

The gating circuits 231–234 are internally connected in an analogous manner and externally connected, via respective stores 241–244, to respective binary-to-decimal converter circuits 251–254.

In operation, the recorded signal from the recording equipment enters the replay circuit 200 at 202, the audio component of the signal being amplified in the amplifier 204 and reproduced by the loudspeaker.

The "bursts" of square waves hereinbefore described pass to the filters 211–215. Since square waves having a frequency of 5,120 c./s. are present in every "burst," a single corresponding to every "burst" is produced at the output of the filter 211 and subsequently rectified so as to trigger the Schmitt trigger 221. Pulses corresponding to each "burst" are therefore produced at the output of the Schmitt trigger 221, which pulses drive the counter 228 so as to sequentially energize the outputs 1 to 5 thereof. The outputs 1 to 5, in turn, sequentially energize the gating circuits 235, 234, 233, 232 and 231, in that order.

Similarly, the filters 212–215 transmit only their respective frequencies, if these frequencies are present in a "burst", so that the presence of a signal at the output of a particular Schmitt trigger during a "burst" is indicative of the presence of the respective frequency in that "burst". Thus during the first "burst" of a group of five "bursts", signals indicative of the frequencies present in that "burst" pass through the gating circuit 235 to the store 245, whence they pass to the binary-to-decimal converter circuit 255.

A similar series of events occurs when the second to fifth "bursts" arrive, the signals indicative of the frequencies present in each "burst" passing through the gating circuits 234, 233, 232, 231 respectively.

It will be appreciated that the signals at the outputs at the converter circuit 251 are in decimal form and representative of the information put into the coding circuit 50, while the signals at the outputs of the converter circuits 252–255 are also in decimal form and representative of the duration of an operation of the process.

The signals at the outputs of the converter circuits 251–255 may be employed to operate any suitable printing mechanism in known manner. For example, if desired the printing mechanism may comprise a rotary device for each converter circuit, connected to receive the outputs from its respective converter circuit. Each position of the rotary device corresponds to one output of the converter circuit and a comparator compares each output with a fixed voltage and causes the rotary device to index round until it is connected to the energized output. In this case it could be arranged that a print initiation signal is only produced when all the rotary devices have stopped indexing round. Similarly, a reset signal could be derived from the print initiation signal to reset the stores 241–245 and the counter 228 after the printing operation.

If desired, the total accumulated in the converter circuits 252–255 may be transferred to an accumulative counter (not shown) at the end of each operation of the process, the arrangement being such that the total time elapsed since the beginning of the process is printed at the end of each operation, in addition to the duration of the operation.

We claim:

1. A recording system for work study recording in the analysis of an operator's performance of a production process or other job consisting of a number of separate operations, said recording system comprising:
    means whereby spoken information may be recorded,
    means whereby timing signals corresponding to the commencement and termination of each separate operation may be recorded
    mechanically operable means whereby further auxiliary coded information may be recorded,
    means for automatically measuring the elapsed time intervals between successive timing signals,
    means for automatically producing coded signals containing information completely representative of the actual measured elapsed time interval between the just previous two successive timing signals and
    means for recording said coded signals
    whereby each set of recorded coded signals directly indicate the just previous measured elapsed time interval between successive timing signals even though the means for recording may only be actuated during a portion of the total elapsed time.

2. A recording system as in claim 1 wherein the further auxiliary coded information comprises a number representative of a rate at which the operator is working during an operation and a number indicative of a particular operation or process.

3. A recording system as in claim 1 wherein the further auxiliary coded information comprises a number representative of a number indicative of a particular operation or process.

4. A recording system as in claim 1, wherein the further auxiliary coded information comprises a number representative of a rate at which the operator is working during an operation.

5. A recording system as in claim 1, wherein the recording system is part of a tape recorder.

6. A recording system as in claim 1, wherein the means whereby spoken information may be recorded comprises a microphone used in conjunction with recording means.

7. A recording system as in claim 6 wherein said means whereby spoken information may be recorded further comprises low pass frequency filter means connected to receive speech signals from the microphone and to transmit the filtered signals through gate means and to transmit the filtered signals through gate means and signal mixing means to means adapted to record said signals.

8. A recording system as in claim 7 wherein the gate means has first and second inputs, the first input being connected to receive signals from the filter means, and the second input being connected to receive inhibiting signals whereby the gate means may block the transmission of signals from the filter means to the signal mixing means while binary coded signals are being recorded.

9. A recording system as in claim 7 wherein the signal mixing means has first and second inputs, the first input being adapted to receive signals from the gate means, and the second input being adapted to receive binary coded signals, and wherein said signal mixing means has an output adapted to pass said signals to means adapted to record said signals.

10. A recording system as in claim 1, wherein the means for measuring elapsed time comprises a pulse generator operatively connected to a counter.

11. A recording system as in claim 10 wherein the pulse generator comprises a crystal oscillator circuit.

12. A recording system as in claim 10 wherein the pulse generator comprises a Wien bridge oscillator circuit.

13. A recording system as in claim 10, wherein the counter is adapted to produce digital output signals in binary-coded decimal form.

14. A recording system as in claim 13 wherein the mechanically operable means comprises a second counter also adapted to produce digital output signals in binary-coded decimal form.

15. A recording system as in claim 10 wherein the means for producing coded signals comprises gating means for receiving the digital output signals from the first-mentioned counter and for producing a plurality of coded signals the frequencies of which are dependent upon said digital output signals from the first-mentioned counter.

16. A recording system as in claim 15 wherein there is a third counter for storing further coded information and for producing output signals in binary-coded decimal form and wherein the gating means is also connected to receive the output signals from this third counter and to produce coded signals the frequencies of which are dependent upon said output signals from the third counter.

17. A recording system as in claim 15 where there is provided frequency dividing means connected to receive pulses from the pulse generator and to produce a plurality of frequency signals whose frequencies are harmonics of the lowest frequency, said gating means being connected to receive said frequency signals so as to produce said coded signals in response to the digital output signals from the first-mentioned counter.

18. A combined recording and reproduction system comprising a recording system as in claim 15 and further comprising:
a replay circuit for receiving recorded signals previously recorded by the recording equipment and including a plurality of frequency filters, each adapted to transmit only those signals having a frequency substantially equal to a respective one of the frequencies of the coded signals.

19. A combined recording and reproduction system as in claim 18, wherein said replay circuit further comprises:
a plurality of rectifying means connected to receive the signals transmitted by respective filters, each rectifying means being operatively connected to a respective device having a bistable output.

20. A recording system for use in work-time studies, said system comprising:
audio means for producing audio signals representing voice comments relating to the work operations under study,
start and stop mark switch means for producing marking signals corresponding to the starting and ending of a particular work operation,
time interval measuring means operatively connected to said mark switch means for measuring the time duration between successive marking signals,
time coding means for producing a plurality of coded elapsed time signals representative of the measured time duration,
auxiliary information coding means for producing a plurality of coded auxiliary information signals representative of information related to the work operations under study, and
recording means for effecting recording of said audio signals, said coded elapsed time signals and said coded auxiliary information signals.

21. A recording system as in claim 20 wherein said recording means comprises a single channel magnetic tape recorder and said audio means includes gate means connected to said mark switch means for preventing recordation of said audio signals when said coded signals are being recorded.

22. A recording system as in claim 20 wherein:
said time interval measuring means comprises a digital counter connected to a clock source of pulses and providing binary coded decimal digital output signals for each digit of the measured time duration.

23. A recording system as in claim 22 wherein said time coding means comprises:
a plurality of groups of logic gate means connected to respective digital outputs of said digital counter and to sources of signals having different frequencies for selectively passing a combination of signal frequencies corresponding to the binary coded decimal digital output for the respectively corresponding digit of the measured time duration, and
summing means for combining said combination of signal frequencies for concurrent recording by said recording means.

24. A recording system as in claim 22 wherein said auxiliary information coding means comprises:
means for generating and storing digital signals corresponding to said auxiliary information, and
a further group of gate means connected to digital output signals from said means for generating and to said sources of signals having different frequencies for selectively passing a combination of signal frequencies corresponding to said auxiliary information to said summing means.

25. A recording system as in claim 24 including means for sequentially scanning and opening said groups of gates in unison in response to said marking signals thereby sequentially gating bursts of frequency coded signals to said recording means representing each successive digit of the measured time duration and of said auxiliary information.

26. A recording system as in claim 24 wherein said clock source of pulses includes a plurality of frequency dividers and wherein said sources of signals having different frequencies comprises connections to outputs of said plurality of frequency dividers.

* * * * *